Oct. 27, 1931. P. S. LEGGE 1,828,740
TOOL FOR CUTTING STONE
Filed Oct. 30, 1928
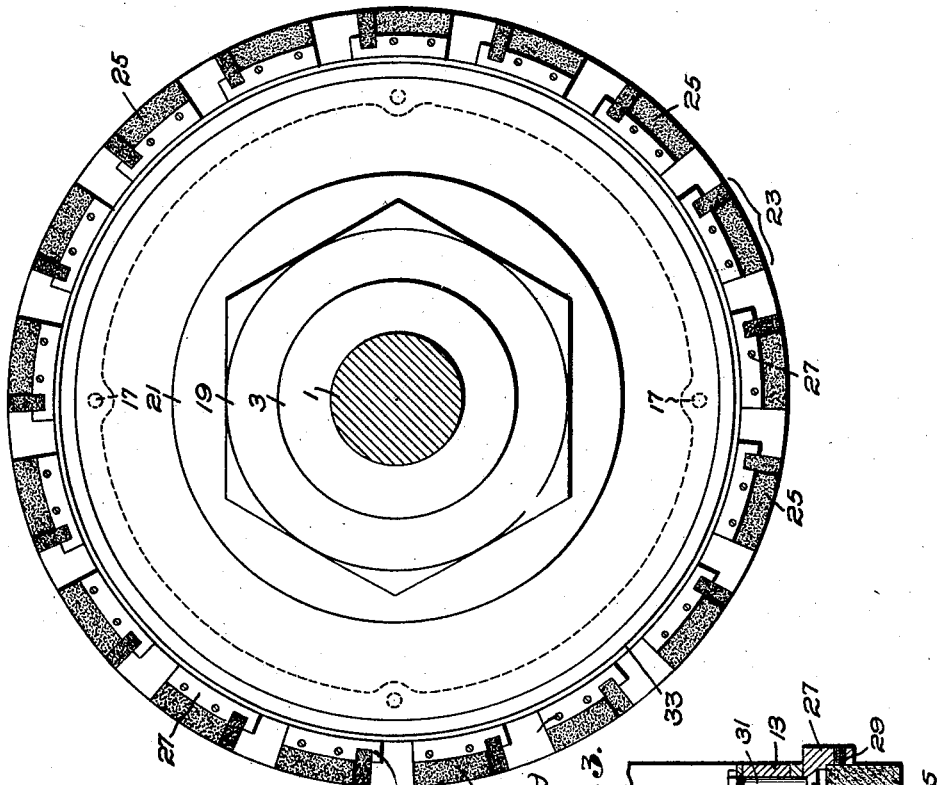
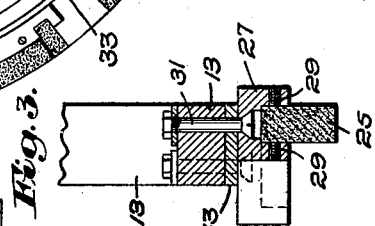
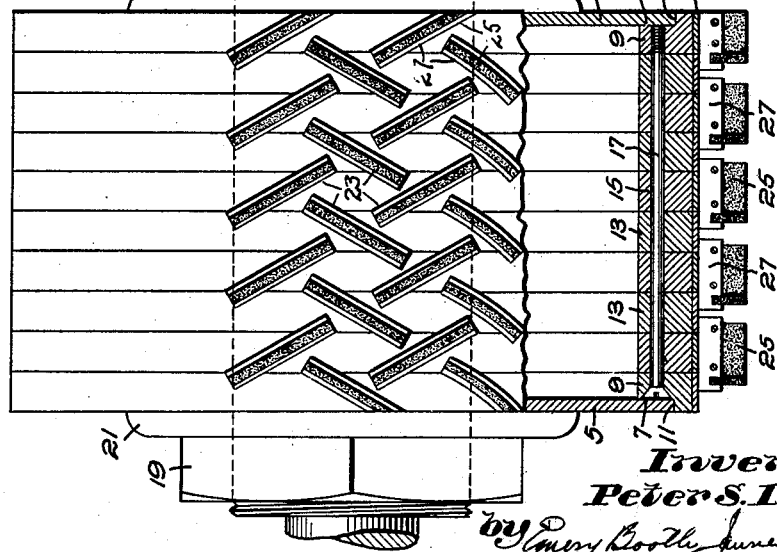
Inventor:
Peter S. Legge, Patented Oct. 27, 1931

1,828,740

UNITED STATES PATENT OFFICE

PETER S. LEGGE, OF POMPTON LAKES, NEW JERSEY

TOOL FOR CUTTING STONE

Application filed October 30, 1928. Serial No. 316,072.

The invention relates to machines for surfacing or cutting stone and will be best understood from the following description when read in the light of the accompanying drawings showing one specific embodiment of the invention, while the scope of the invention will be more particularly pointed out in the appended claims.

In the drawings:—

Fig. 1 is an elevation of a tool constructed according to the invention with parts broken away;

Fig. 2 is an end elevation of the tool constructed according to Fig. 1; and

Fig. 3 shows a detail of one manner of securing the abrasive members and their holders of Figs. 1 and 2 to the ring members of said figures.

Referring to the drawings, a suitably driven shaft or spindle 1 is provided, upon which is placed a sleeve 3 suitably secured thereto in non-rotatable relation. Upon the sleeve 3 are placed end discs 5, the peripheral portions of which enter recesses 7 on the end rings 9, the shoulders 11 of the recesses acting to center the end rings concentrically with the shaft. Between the end rings 9 is a plurality of intermediate rings 13 secured in assembled relation with the rings 9 by bolts 15 screw-threaded at one end 17 into one of the rings 9. The body of the tool thus formed is clamped to the sleeve 3 by means of the nuts 19, screw-threaded on the end portions of the sleeve, and the collars 21 between the nuts and the discs 5.

As shown, each disc carries a plurality of grinding elements 23 which herein are in the form of narrow strips 25, preferably carborundum, fitting into channel-shaped holders 27 and retained therein by set screws 29. The holders 27 are shown as each secured to the rings 13 by a pair of screw bolts 31, the bottom of the channel-shaped portions of the holders being perforated and countersunk for this purpose, as illustrated in Fig. 3. If desired, a rubber layer 33 may be placed between the holders 27 and rings 9 and 13.

As will be observed from Fig. 1, all the rings 13 are formed alike, the holders 23 overlapping the edges of the rings. In assembling the tool, alternate rings are turned so as to incline the cutting elements thereof in opposite directions which causes the ends of the cutting elements of the several rings to overlap so that a smooth surface will be cut upon the stone.

It will be observed, as the tool is rotated, the points of contact of the cutting elements with the stone will constantly change in a direction parallel to the axis of the tool, and that on a tangent surface to the tool, the points of contact in effect reciprocate, due to the oppositely inclined elements lying one behind the other circumferentially of the tool.

It will be understood that wide deviations may be made from the submitted embodiment of the invention without departing from the spirit thereof.

Claims:

1. A rotary tool for cutting stone comprising a series of members each assembled coaxially of said tool, each member presenting an annular series of cutting portions inclined to the axis of said tool.

2. A rotary tool for cutting stone comprising a series of members each assembled coaxially of said tool, each member presenting an annular series of cutters, the cutters of adjacent members being oppositely inclined relative to the axis of said tool.

3. A rotary tool for cutting stone comprising a series of members each assembled coaxially of the tool, each member carrying an annular series of cutters which overlap a side of said member, whereby when said members are in assembled relation the cutters of one member have portions lying between the cutters of an adjacent member.

4. A rotary tool for cutting stone comprising a series of members each assembled coaxially of said tool, each member presenting an annular series of cutters inclined to the axis of said tool and having end portions overlying one of the sides of said members, whereby when said members are in assembled relation the cutters of one member have portions lying between the cutters of an adjacent member.

5. A rotary tool for cutting stone comprising a series of members each assembled coaxially of said tool, each member presenting an annular series of cutters, the cutters of adjacent members being oppositely inclined relative to the axis of said tool, said cutters having end portions overlying one of the sides of said members, whereby when said members are in assembled relation the cutters of one member have portions lying between the cutters of an adjacent member.

In testimony whereof, I have signed my name to this specification.

PETER S. LEGGE.